US007149885B2

(12) United States Patent
Yonemura (10) Patent No.: US 7,149,885 B2
(45) Date of Patent: Dec. 12, 2006

(54) AUTOMATIC CONCEALMENT OF EXPANSION CARDS IN COMPUTER SYSTEM

(75) Inventor: Takashi Yonemura, Tokyo (JP)

(73) Assignee: NEC Corporation, Tokyo (JP)

( * ) Notice: Subject to any disclaimer, the term of this patent is extended or adjusted under 35 U.S.C. 154(b) by 462 days.

(21) Appl. No.: 10/406,249

(22) Filed: Apr. 4, 2003

(65) Prior Publication Data

US 2003/0191931 A1 Oct. 9, 2003

(30) Foreign Application Priority Data

Apr. 5, 2002 (JP) ............................. 2002-103732

(51) Int. Cl.
*G06F 15/177* (2006.01)
(52) U.S. Cl. ........................................................ 713/1
(58) Field of Classification Search .................. 713/1
See application file for complete search history.

(56) References Cited

U.S. PATENT DOCUMENTS

| 5,018,146 | A | * | 5/1991 | Sexton ........................ 714/781 |
| 5,479,612 | A | * | 12/1995 | Kenton et al. ............... 713/200 |
| 5,579,509 | A | * | 11/1996 | Furtney et al. ............... 703/27 |
| 5,822,565 | A | * | 10/1998 | DeRosa et al. ............... 703/24 |
| 6,336,152 | B1 | * | 1/2002 | Richman et al. ............... 710/8 |
| 6,397,327 | B1 | * | 5/2002 | Klebanov ........................ 713/1 |
| 6,457,069 | B1 | * | 9/2002 | Stanley ........................... 710/8 |
| 6,549,027 | B1 | * | 4/2003 | Mott ............................ 324/764 |
| 6,661,236 | B1 | * | 12/2003 | Goers et al. .................. 324/537 |
| 6,950,964 | B1 | * | 9/2005 | McMichael et al. .......... 714/38 |
| 2001/0052069 | A1 | * | 12/2001 | Sekiguchi ........................ 713/2 |
| 2002/0013882 | A1 | * | 1/2002 | Ko et al. ........................ 711/111 |
| 2002/0042892 | A1 | * | 4/2002 | Gold ............................. 714/6 |
| 2002/0188836 | A1 | * | 12/2002 | Gurumoorthy et al. ........ 713/1 |

FOREIGN PATENT DOCUMENTS

| JP | 63-231560 | 9/1988 |
| JP | 7-325731 | 12/1995 |
| JP | 8-36485 | 2/1996 |
| WO | WO 01/93032 A1 | 12/2001 |

* cited by examiner

*Primary Examiner*—Thomas Lee
*Assistant Examiner*—Vincent Tran
(74) *Attorney, Agent, or Firm*—McGinn IP Law Group, PLLC (57) ABSTRACT

In a computer system selectively operable in multiple operating systems, supported-card identification information identifying types of expansion cards supported by respective ones of the operating systems is previously stored. An unsupported expansion card is determined among the plurality of expansion cards based on identification information supported by a selected operating system. The unsupported expansion card is powered off to conceal it from the selected operating system.

19 Claims, 6 Drawing Sheets

AUTOMATIC CONCEALMENT OF EXPANSION CARDS IN COMPUTER SYSTEM

BACKGROUND OF THE INVENTION

1. Field of the Invention

The present invention relates to a computer system which is capable of booting multiple operating systems, such as Windows and Linux, and is provided with a plurality of expansion slots.

2. Description of the Related Art

In general, a computer system is provided with a plurality of expansion card slots for I/O function expansion, typically PCI (peripheral Component Interconnect) expansion slots, into which PCI expansion cards are detachably inserted, respectively. Typical examples of PCI expansion cards are a storage card such as SCSI (Small Computer Standard Interface) or Fiber-channel interface and a network card such as FDDI (Fiber Distributed Data Interface) or Ethernet interface.

In most cases, different operating systems support different types of PCT expansion cards. Accordingly, it is necessary for the computer system to boot up an operating system without mounting PCI expansion cards which are not supported by the operating system. If the computer system mounted with such a not-supported PCI expansion card boots up, there is a possibility that some malfunction occurs.

Recently there have been cases where multiple different operating systems selectively boot up on a single computer system. For example, in the case where online transaction processing is performed in the daytime and batch processing at night, the computer system operates while switching back and forth between an operating system suitable for online transaction processing and another operating system suitable for batch processing.

Accordingly, when a conventional computer system operates in the multi-OS (operating system) selective boot condition, an operator must check to see whether the computer system is not mounted with any PCI expansion card that is not supported by a startup operating system and, when mounted, physically remove the not-supported PCI expansion card from the computer system. This task is cumbersome more and more as the scale of a computer system becomes larger, resulting in that human errors are likely to occur and its maintainability and operability are reduced.

SUMMARY OF THE INVENTION

An object of the present invention is to provide an expansion card concealment control method and a computer system allowing its maintainability and operability to be enhanced.

Another object of the present invention is to provide an expansion card concealment control method and a computer system capable of selectively booting multiple operating systems without the need of physically pulling out any expansion card not supported by a selected operating system.

According to an aspect of the present invention, a method for controlling concealment of a plurality of expansion cards mounted in a computer system selectively operable in a plurality of operating systems, includes the steps of: a) previously storing supported-card identification information, wherein the supported-card identification information identifies types of expansion cards supported by respective ones of the operating systems; b) determining an unsupported expansion card among the plurality of expansion cards based on identification information supported by a selected operating system, wherein the unsupported expansion card is not supported by the selected operating system; and c) powering off the unsupported expansion card to conceal it from the selected operating system.

The step b) may include the steps of: b.1) creating a first mounted-card information table upon system startup, wherein the first mounted-card information table contains entries for respective ones of the plurality of expansion cards mounted in the computer system, wherein each of the entries includes mounted-card identification information for a corresponding expansion slot; and b.2) determining an unsupported expansion card among the plurality of expansion cards based on the first mounted-card information table and supported-card identification information of a selected operating system, wherein the unsupported expansion card is not supported by the selected operating system. The step c) may include the steps of: c.1) deleting an entry for the unsupported expansion card from the first mounted-card information table to produce a second mounted-card information table for operation of the selected operating system; and c.2) powering off an expansion slot mounted with the unsupported expansion card to conceal the unsupported expansion card from the selected operating system.

According to another aspect at the present invention, a method for controlling concealment of a plurality of expansion cards mounted in a computer system selectively operable in a plurality of operating systems, includes the steps of: a) previously storing supported-card identification information, wherein the supported-card identification information identifies types of expansion cards supported by respective ones of the operating systems; b) creating a first mounted-card information table upon system startup, wherein the first mounted-card information table contains entries for respective ones of the plurality of expansion cards mounted in the computer system, wherein each of the entries includes mounted-card identification information for a corresponding expansion slot; c) storing startup information including the first mounted-card information table and setting information of a selected operating system; d) determining whether the startup information is different from previous-startup information, wherein the previous-startup information includes previous setting information of a previously selected operating system and a previously stored first mounted-card information table; e) when the startup information is different from previous-startup information, determining an unsupported expansion card among the plurality of expansion cards based on the first mounted-card information table and supported-card identification information of the selected operating system, wherein the unsupported expansion card is not supported by the selected operating system; f) deleting an entry for the unsupported expansion card from the first mounted-card information table to produce a second mounted-card information table for operation of the selected operating system; g) when the startup information is identical to the previous-startup information, using a previously stored second mounted-card information table as the second mounted-card information table; h) powering off an expansion slot mounted with an unsupported expansion card depending on the second mounted-card information table to conceal the unsupported expansion card from the selected operating system; i) storing the second mounted-card information table; and j) booting up the selected operating system based on the second mounted-card information table.

As described above, the identification information of expansion cards supported by each of multiple operating systems are previously stored. Among expansion card actually mounted in the computer system, an expansion card which is not supported by a startup operating system is detected and powered off.

Accordingly, any unsupported expansion card detected from the mounted expansion cards can be automatically concealed from the startup operating system. System malfunction or failure that may be caused by human errors can be automatically avoided, resulting in enhanced maintainability and operability.

Further, since the unsupported expansion card is logically concealed, there is no need of physically remove the unsupported expansion card from the computer system.

Furthermore, in the case where a plurality of different operating systems selectively boot up on a single computer system, there is no need of manually replacing all unsupported expansion cards with supported expansion cards for each switching of the operating systems, resulting in reduced time and cost required for switching of the operating systems.

DESCRIPTION OF THE PREFERRED EMBODIMENTS

Figure 1:
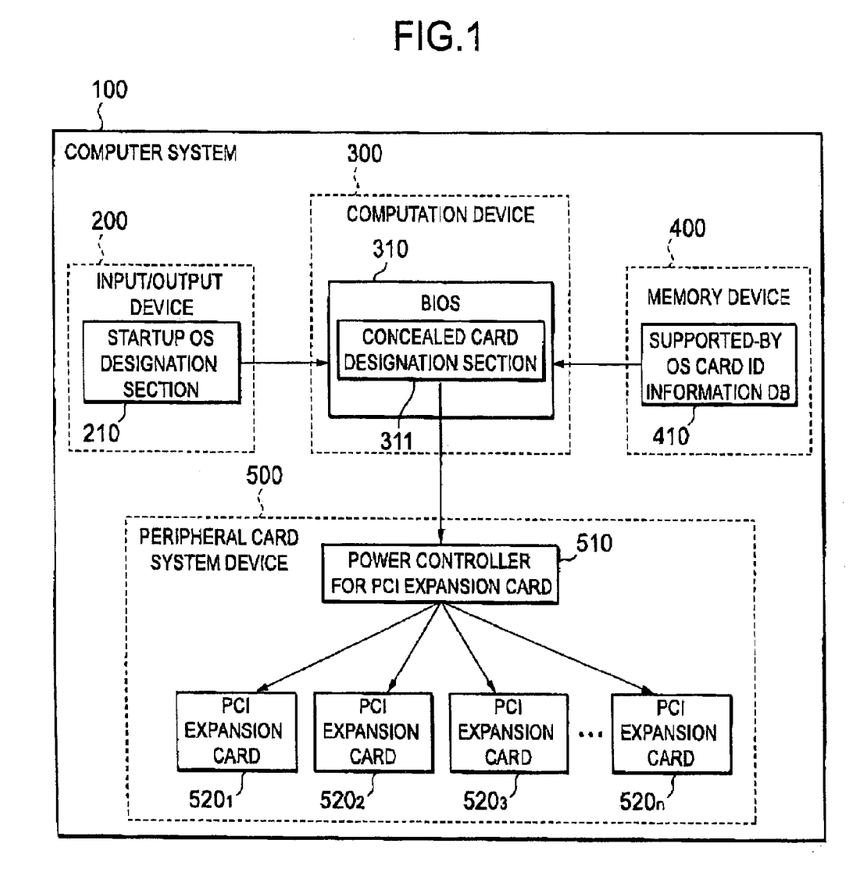
FIG. 1 is a block diagram showing a schematic architecture of a computer system according to the present invention.

Referring to FIG. 1, a computer system 100 according to the present invention is conceptually composed of an input/output device 200, a computation device 300, a memory device 400, and a peripheral card system device 500.

The input/output device 200 is a user interface for instruction input, menu display and the like, which may be a keyboard, a pointing device, and a monitor. Here, the input/output device 200 functionally includes a startup OS designation section 210, which is used to designate the type and revision of an operating system to boot up on the computer system 100.

The computation device 300 is a control section of the computer system, which functionally includes a BIOS (Basic Input Output System) 310. The BIOS 310 is a firmware composed of a set of routines running on the computation device 300 to provide various initial settings, test of the computer system and other internal services. According to the present invention, the BIOS 310 further provides a concealed card determination section 311. As will be described later, the concealed card determination section 311 identifies an unsupported PCI expansion card and a PCI expansion slot having the unsupported PCI expansion card inserted thereto.

The memory device 400 includes a database 410 storing identification information of PCI expansion cards supported by each revision of each operation system allowed to boot up on the computer system 100. The identification information identifies the type of each PCI expansion card.

The peripheral card system device 500 includes a PCI expansion card power controller 510 and n PCI expansion card slots into which PCI expansion cards $520_1$–$520_n$ are inserted, respectively, where n is an integer greater than 1. As will be described later, the PCI expansion card power controller 510 controls power supply to each of the PCI expansion cards $520_1$–$520_n$ by individually powering on/off the PCI expansion card slots under control of the concealed card determination section 311 of the computation device 300.

More specifically, when an operator designates a startup operating system through the startup OS designation section 210, the concealed card determination section 311 uses the database 410 to find a PCI expansion card that is not supported by the designated startup operating system, from the PCI expansion cards $520_1$–$520_n$ connected in the computer system 100. When at least one unsupported PCI expansion card has been found, the PCI expansion card power controller 510 powers off a corresponding PCI expansion card slot. In this manner, the unsupported PCI expansion card is automatically concealed from the computer system 100.

First Embodiment

Figure 2:
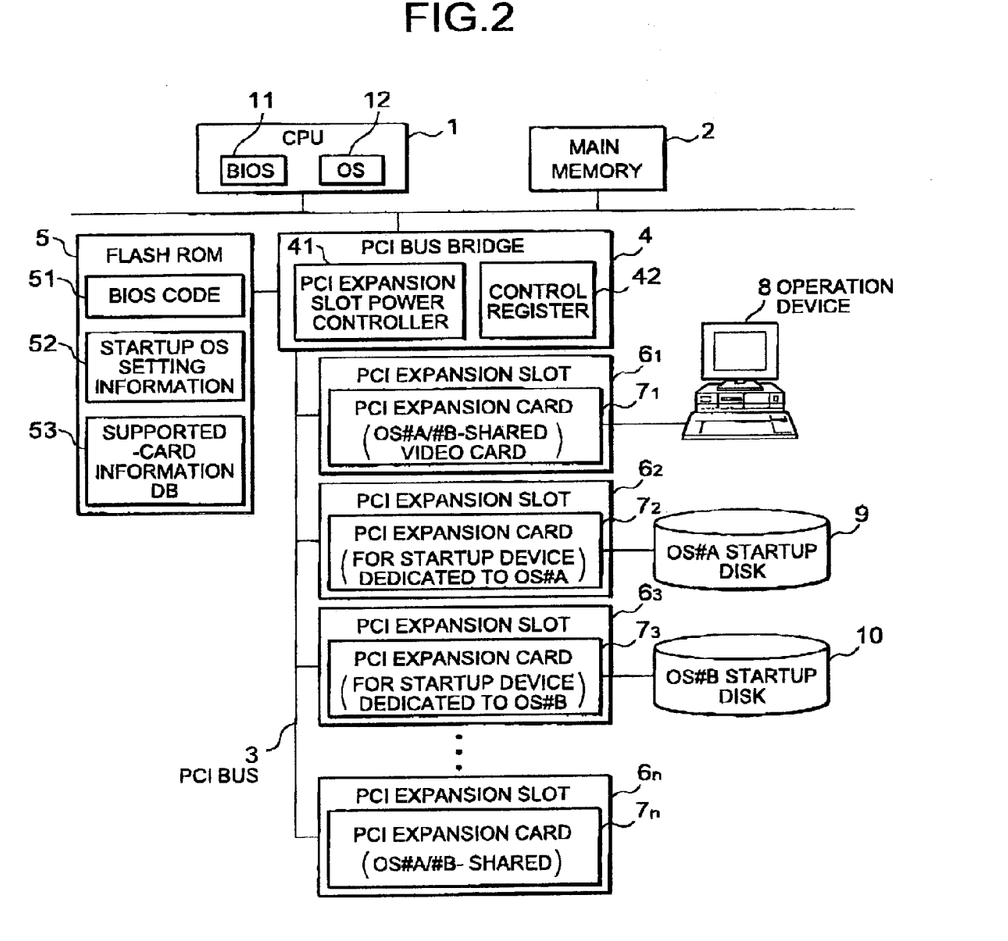
FIG. 2 is a block diagram showing a computer system according to a first embodiment of the present invention.

As shown in FIG. 2, a computer system according to a first embodiment of the present invention includes a central processing unit (CPU) 1 which is connected to a main memory 2 and a PCI bus bridge 4 through a system bus. The PCI bus bridge 4 is connected to a PCI bus 3 and a flash RCOM (Read-Only Memory) 5. The PCI bus 3 is provided with n PCT expansion slots $6_1$–$6_n$.

It is assumed that the respective PCI expansion slots $6_1$–$6_n$ have PCI expansion cards $7_1$–$7_n$ inserted thereto. For example, the PCI expansion card $7_1$ is a video card shared between operating systems OA#A and OS#B, which is inserted into the PCI expansion slot $6_1$ and is connected to an operation device 8 (here, a monitor). The PCI expansion card $7_2$ is designed to connect a startup device dedicated to the operating system OS#A, which is inserted into the PCI expansion slot $6_2$ and is connected to an OS#A-dedicated startup disk 9. The PCI expansion card $7_3$ is designed to connect a startup device dedicated to the operating system OS#B, which is inserted into the PCI expansion slot $6_3$ and is connected to an OS#B-dedicated startup disk 10. The PCI expansion card $7_n$ is designed to share between the operating systems OA#A and OS#B and is inserted into the PCI expansion slot $6_n$. Some PCI expansion slots may have no PCI expansion card inserted thereto.

As described later, when the computer system powers on, the CPU 1 boots up BIOS 11 to prepare the computer system for operation and, after the processing of the BIOS 11, boots up a designated operating system 12. A BIOS setup section that enables the operator to select a startup operating system can be displayed on the operation device 8, which will be described later.

The main memory 2 stores system information such as a queue of CPU instructions, arithmetic data and the like and further a mounted-card/slot information table, which will be described with reference to FIG. 3.

The PCI bus bridge 4 includes a PCI expansion slot power controller 41 and a control register 42. The PCI expansion slot power controller 41 individually controls power-on/off of the PCI expansion slots $6_1$–$6_n$ depending on control data stored in the control register 42.

For example, the control register 42 has a plurality of control flags each corresponding to the PCI expansion slots $6_1$–$6_n$. When a control flag corresponding to the PCI expansion slot $6_1$ is set, the PCI expansion slot power controller 41 powers on the PCI expansion slot $6_1$. On the other hand, when a control flag corresponding to the PCI expansion slot $6_1$ is reset, the PCI expansion slot power controller 41 powers off the PCI expansion slot $6_1$.

The flash ROM 5 includes a BIOS code area 51 storing the BIOS code, a startup OS setting information area 52 storing startup OS type and revision setting values, and a supported-card information database 53 storing identification information of PCI expansion cards supported by each revision of each multiple operating system allowed to boot up in the computer system.

As described above, the startup OS designation section 210 of FIG. 1 corresponds to the BIOS setup section for various BIOS settings through the operation device 8. The database 410 of FIG. 1 corresponds to the supported-card information database 53 in the flash ROM 5. The concealed card determination section 311 of FIG. 1 corresponds to an operation of the BIOS 11 on the CPU 1.

Figure 3:
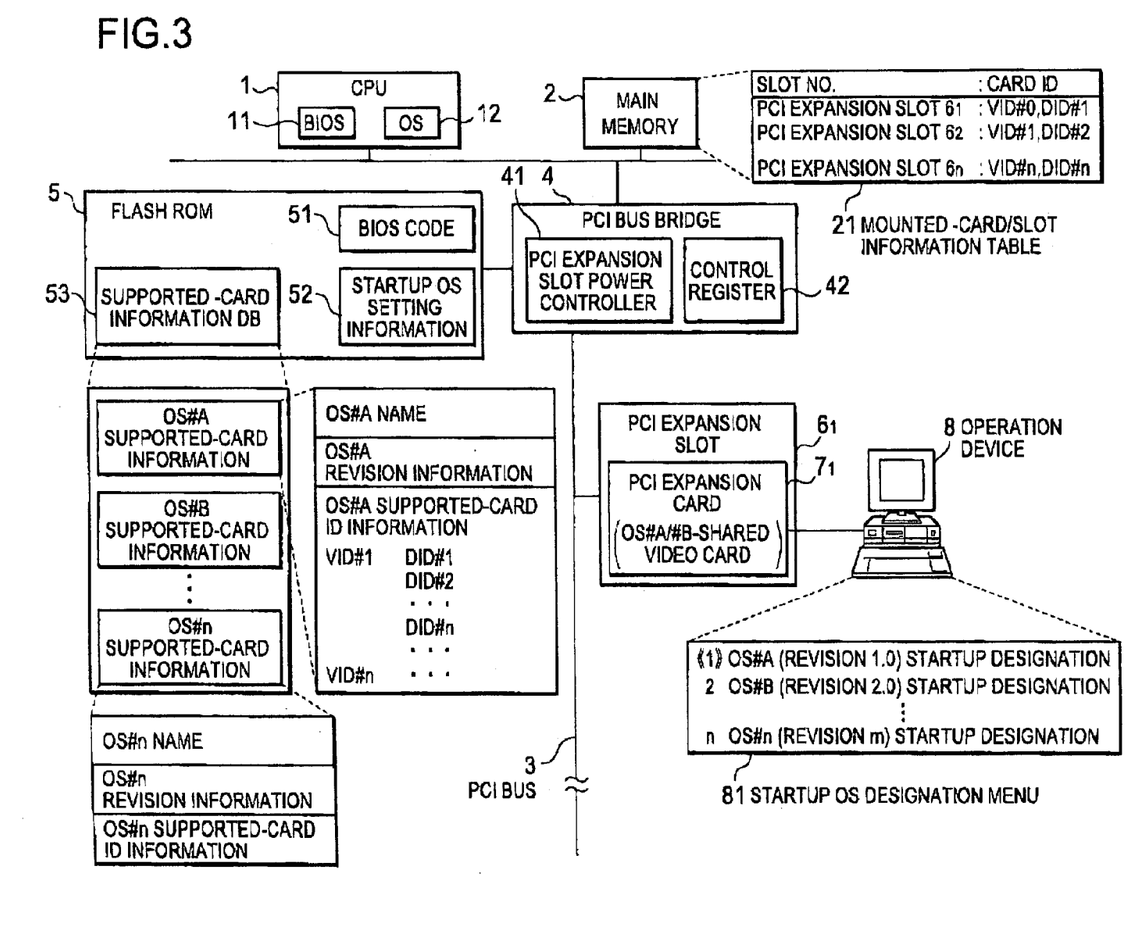
FIG. 3 is an explanatory schematic diagram showing an example of the computer system according to the first embodiment.

FIG. 3 shows an example of the first embodiment for explanation of the operation.

Referring to FIG. 3, the BIOS setup section is a startup OS designation menu 81 displayed on the operation device 8. The startup OS designation menu 81 includes a list of operating systems allowed to boot up in the computer system, each of the listed operating systems being indicated by its name and revision number. The operator can use the operation device 8 to select a desired one of the listed operating systems. In FIG. 3, the first operating system OS#A (Revision 1.0) is highlighted and selected by default. Here, it is assumed that the first one of the listed operating systems is the default OS.

The supported-card information database 53 retrievably stores information of supported cards for each revision of each operating system allowed to boot up in the computer system. Here, supported card information for each of the operating systems OS#A, OS#B, . . . OS#n is stored in the supported-card information database 53. Each supported card information is composed of the name and revision information of an operating system and the identification information of PCI expansion cards supported by the operating system. In this embodiment, the identification information is composed of a set of vendor identification (VID) uniquely assigned to the supported PCI expansion card for each vendor and device identification (DID) uniquely assigned to the supported PCI expansion card for each card type in the vendor. In FIG. 3, for example, a vendor of VID#1 provides a plurality of supported-by-OS#A PCI expansion cards DID#1, DID#2, . . . DID#n. The BIOS 11 identifies the type of each of the PCI expansion cards $7_1$–$7_n$ depending on a set of VID and DID.

The mounted-card/slot information table 21 is stored in the main memory 2. The mounted-card/slot information table 21 is composed of a slot number field and a card ID field. In this example, slot numbers of the PCI expansion slots $6_1$–$6_n$ are stored in the slot number field. The identification information (sets of VID and DID) of the PCI expansion cards $7_1$–$7_n$ each inserted into the PCI expansion slots $6_1$–$6_n$ are stored in the card ID field. For example, a PCI expansion card identified by the set of VID#0 and DID#1 is inserted into the PCI expansion slot $6_1$. Accordingly, the BIOS 11 can identify the type of each PCI expansion card and the card-mounted location (PCI expansion slot number) thereof. How to create the mounted-card/slot information table 21 will be described later.

Operation

A detailed operation of the first embodiment will be described, taking the case shown in FIG. 3 as an example.

Figure 4:
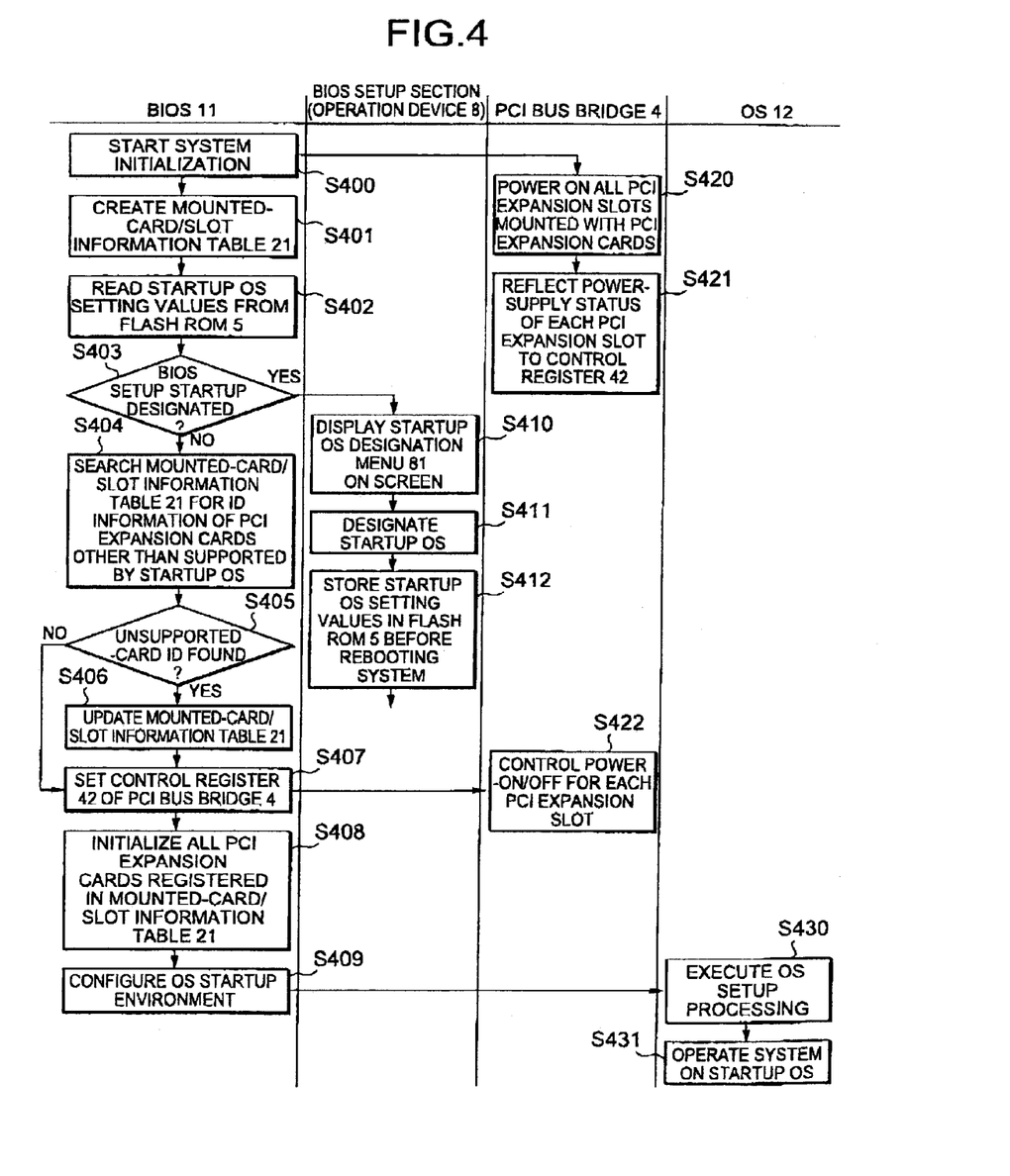
FIG. 4 is a flow chart showing an automatic concealment operation according to the first embodiment.

Referring to FIG. 4, when an operator uses the operation device 8 to power on the computer system, the CPU 1 starts fetching the BIOS code from the BIOS code area 51 of the flash ROM 5 to boot up the BIOS 11.

The BIOS 11 starts system initialization including test of the CPU 1, initialization and diagnosis of the main memory 2, and initialization of the PCI bus bridge 4 (step S400).

When the system initialization starts, the PCI expansion slot power controller 41 of the PCI bus bridge 4 powers on all the PCI expansion slots $6_1$–$6_n$ each mounted with the PCI expansion cards $7_1$ $7_n$ (step S420). The power-supply status of each PCI expansion slot is reflected to the control register 42 (step S421).

In the system initialization, the BIOS 11 detects the PCI expansion cards $7_1$–$7_n$ connected to the PCI bus 3 and collects identification information (a set of VID and DID) of each of the detected PCI expansion cards $7_1$–$7_n$. In this manner, the BIOS 11 determines the mounting location (slot number) and identification information of each of the PCI expansion cards $7_1$–$7_n$ and creates the mounted-card/slot information table 21 (step S401).

Subsequently, the BIOS 11 reads current setting values of type and revision of a startup operating system from the startup OS setting information area 52 of the flash ROM 5 (step S402) and then determines whether the BIOS setup is designated (step S403). Usually, the BIOS setup function boots up by depressing a predetermined key such as "F2" key or "Delete" key after power-on.

When the BIOS setup is designated (YES in step S403), the BIOS 11 boots up the BIOS setup section on the operation device 8. In this embodiment, as described before, the BIOS setup section displays the startup OS designation menu 81 on the monitor so that the operator can designate a startup operating system from the list of operating systems allowed to boot up in the computer system (step S410). The startup OS designation menu 81 is created from the list of operable operating systems stored in the supported-card information database 53 and the current startup OS type and revision setting values obtained at the step S402. The operator uses the operation device 8 to designate a startup operating system to boot next time on the startup OS designation menu 81 (step S411). When the startup operating system designation has been performed, the BIOS setup section stores the type and revision setting values of the designated startup operating system into the startup OS setting information area 52 of the flash ROM 5 and restarts the system (step S412). When the system reboots up, the control goes back to the step S400 to start system initialization as described above.

In the case where the startup operating system designation has been performed, the BIOS setup is not designated (NO in step S403). In this case, the BIOS 11 continues the system initialization (steps S404–S409).

Next, the BIOS 11 uses the supported-card information database 53 to search the mounted-card/slot information table 21 for the identification information (VID and DID) of a PCI expansion card that is not supported by the designated startup operating system (step S404).

When the identification information (VID and DID) identifying a PCT expansion card that is not supported by the designated startup operating system is found in the mounted-card/slot information table 21 (YES in step S405), the BIOS 11 updates the mounted-card/slot information table 21 to delete the entry of such an unsupported PCI expansion card (step S406). When the identification information of such an unsupported PCI expansion card is not found in the mounted-card/slot information table 21 (NO in step S405), the update step S406 is skipped.

When the mounted-card/slot information table 21 has been finally determined as described above, the BIOS 11 nets the control register 42 of the PCI bus bridge 4 based on the contents of the mounted-card/slot information table 21 (step S407). More specifically, when the entry of an unsupported PCI expansion card is deleted from the mounted-card/slot information table 21 in the step S406, the control flag of the control register 42 corresponding to the PCI expansion slot mounted with the unsupported PCI expansion card is reset, and the control flags each corresponding to the PCI expansion slots mounted with the remaining supported PCI expansion cards are set.

The PCI expansion slot power controller 41 looks at the control flags of the control register 42 to individually control power-on/off the PCI expansion slots $6_1$–$6_n$ (step S422). For example, when a control flag corresponding to the PCI expansion slot $6_1$ is set, the PCI expansion slot power controller 41 powers on the PCI expansion slot $6_1$. On the other hand, when a control flag corresponding to the PCI expansion slot $6_1$ is reset, the PCI expansion slot power controller 41 powers off the PCI expansion slot $6_1$. In this manner, the PCI expansion slot mounted with an unsupported PCI expansion card is powered off and thereby the unsupported PCI expansion card is concealed from the startup operating system 12.

After the step S407, the BIOS 11 initializes all the PCI expansion cards whose entries are registered in the mounted-card/slot information table 21 (step S408) and then configures the startup environment for the operating system 12 (step S409).

After the OS startup environment has been completed, the designated operating system 12 boots to start the computer system operating on the operating system 12 depending on operations of the operation device 8 (step S430 and S431).

EXAMPLE

Assuming that an operating system OS#A (Revision 1.0) is designated as a startup operating system in the step S411, the BIOS 11 accesses the OS#A (Revision 1.0) supported-card information of the supported-card information database 53, that is, the sets of VID and DID supported by the operating system OS#A (Revision 1.0): (VID#1, DID#1), (VID#1, DID#2), . . . as shown in FIG. 3.

Thereafter, the BIOS 11 determines whether a sequentially selected one of the mounted-card/slot information entries stored in the main memory 2 is found in the sets of VID and DID: (VID#1, DID#1), (VID#1, DID#2), . . . (step S404, S405).

If the selected mounted-card/slot information entry in not found in the OS#A supported-card ID information (YES in step S405), then it is determined that the PCI expansion card identified by the selected entry is not supported by the operating system OS#A (Revision 1.0) and therefore the selected entry is deleted from the mounted-card/slot information table 21 (step S406). For example, since the PCI expansion card $7_3$ inserted in the PCI expansion slot $6_3$ is dedicated to the operating system OS#B as shown in FIG. 2, the mounted-card/slot information entry for the PCI expansion slot $6_3$ is deleted from the mounted-card/slot information table 21. In this manner, there are left only mounted-card/slot information entries for the supported PCI expansion cards in the mounted-card/slot information table 21.

Thereafter, the BIOS 11 sets the control register 42 of the PCI bus bridge 4 based on the contents of the mounted-card/slot information table 21 (step S407). The PCI expansion slot power controller 41 looks at the control flags of the control register 42 to individually control power-on/off the PCI expansion slots $6_1$–$6_n$ (step S422). In this example, the PCI expansion slot $6_3$ is powered off and therefore the PCI expansion card $7_3$ is concealed from the operating system OS#A.

Second Embodiment

Figure 5:
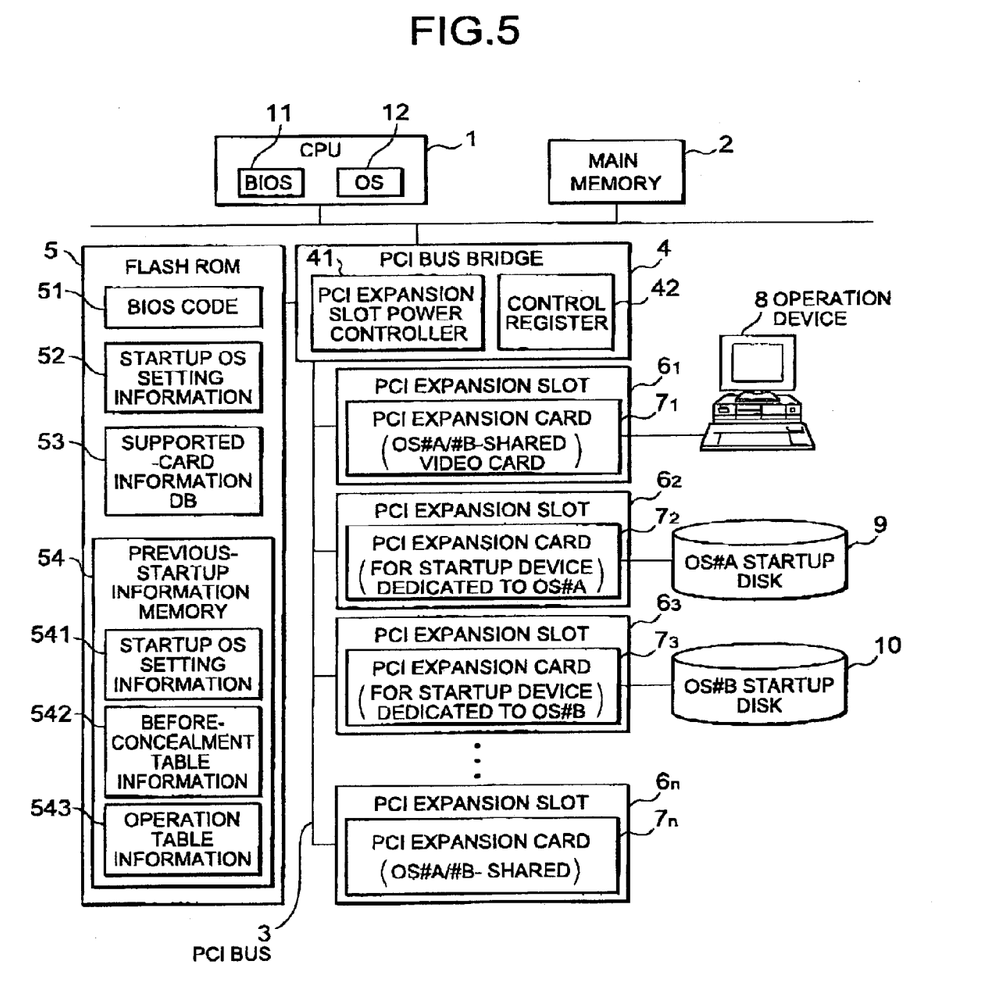
FIG. 5 is a block diagram showing a computer system according to a second embodiment of the present invention.

As shown in FIG. 5, a computer system according to a second embodiment of the present invention includes the flash ROM 5 which further stores a previous-startup information memory 54 including a startup OS setting information area 541, a before-concealment table information area 542 and an operation table information area 543. In FIG. 5, blocks similar to those previously described with reference to FIG. 2 are denoted by the same reference numerals and their descriptions will be omitted.

The startup OS setting information area 541 stores setting values of the startup operating system that was designated at the previous system startup. The before-concealment table information area 542 stores information of a mounted-card/slot information table 21 that was set before concealment of PCI expansion cards at the previous system startup. The operation table information area 543 stores information of a mounted-card/slot information table 21 in system operation, that was set after concealment of PCI expansion cards at the previous system startup.

Operation

An operation of the second embodiment will be described with reference to FIG. 6, in which steps S600–S603 are added to the steps S400–S431 as shown in FIG. 4. Accordingly, the new steps S600–S603 will be described in detail.

Figure 6:
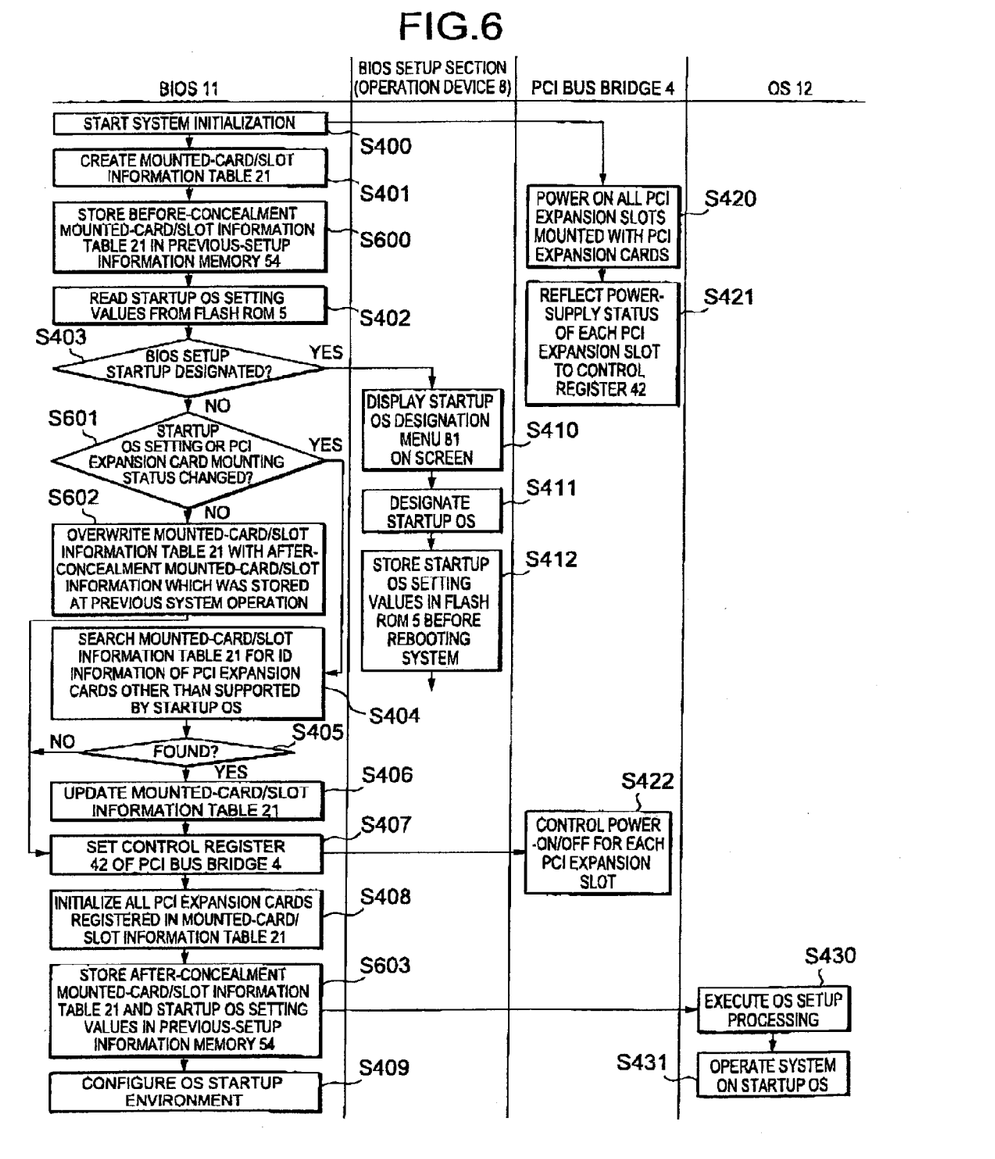
FIG. 6 is a flow chart showing an automatic concealment operation according to the second embodiment.

Referring to FIG. 6, the BIOS 11 stores three pieces of information (the startup OS setting information, the before-concealment table information, and the operation table information) into the previous-startup information memory 54 so that these three pieces of information can be referred to at next system startup.

More specifically, after the step S401, the BIOS 11 stores the before-concealment table information into the before-concealment table information area 542 (step S600). The before-concealment table information is information of the mounted-card/slot information table 21 which indicates the physical mounting status of PCI expansion cards and in which the concealment result of PCI expansion cards is not reflected.

After the step S408, the BIOS 11 stores the operation table information into the operation table information area 543 (step S603). The operation table information is information of the mounted-card/slot information table 21 which indicates the logical mounting status of PCI expansion cards in system operation and reflects the concealment result of PCI expansion cards. In the step S603, the BIOS 11 also stores setting values of the startup operating system into the startup OS setting information area 541.

As described above, the information at the previous system startup is stored in the previous-startup information memory 54 and thereby processing at the next system startup will be described hereinafter.

At step S601 of FIG. 6, the BIOS 11 compares the at-previous-startup stored information (the startup OS setting values stored in the startup OS setting information area 541 and the before-concealment table information stored in the before-concealment table information area 542) to current setting values stored in the startup OS setting information area 52 and current information stored in the mounted-card/slot information table 21. Based on the comparison result, the BIOS 11 determines whether the physical mounting status of PCI expansion cards has been changed since the previous system startup.

When the physical mounting status of PCI expansion cards has been changed since the previous system startup (YES in step S601), the above-described card concealment steps S404–S406 are performed and thereafter the steps S407–S409 except for the step S603 are performed as shown in FIG. 4.

When the physical mounting status of PCI expansion cards has been never changed since the previous system startup (NO in step S601), the BIOS 11 overwrites the mounted-card/slot information table 21 created at the step S401 with the previous after-concealment mounted-card/slot information table information (previous operation table information) indicating the logical mounting status of PCI expansion cards in previous system operation. Since the concealment of PCI expansion cards is reflected in the overwritten mounted-card/slot information table 21, there is no need of the above-described card concealment steps S404–S406. Accordingly, after the step S602, the control goes directly to the step S407. Thereafter, the steps S407–S409 except for the step S603 are performed as shown in FIG. 4.

In the second embodiment as described above, when the physical mounting status of PCI expansion cards has been never changed since the previous system startup, the card concealment steps S404–S406 are not performed. Only when the physical mounting status of PCI expansion cards has been changed since the previous system startup, the card concealment steps S404–S406 are performed. Therefore, in the case of no change in physical mounting status of PCI expansion cards, the time required for system startup can be reduced, compared with the first embodiment.

In the first and second embodiments as described above, the supported-by-OS card ID information database 410 as shown in FIG. 1 is implemented on the flash ROM 5. The present invention is not limited to these embodiments. The same function as the supported-by-OS card ID information database 410 may be implemented in a dedicated memory area in the computer system.

The invention claimed is:

1. A method for controlling concealment of a plurality of expansion cards mounted in a computer system selectively operable in a plurality of operating systems, comprising:
   previously storing supported-card identification information, wherein the supported-card identification information identifies at least two types of expansion cards, each type supported by a respective one of the plurality of operating systems;
   determining an unsupported expansion card among the plurality of expansion cards based on identification information supported by a selected operating system, wherein the unsupported expansion card is not supported by the selected operating system; and
   powering off the unsupported expansion card before the selected operating system is booted.

2. The method according to claim 1, wherein determining an unsupported expansion card comprises:
   creating a first mounted-card information table upon system startup, wherein the first mounted-card information table contains entries for respective ones of the plurality of expansion cards mounted in the computer system, wherein each of the entries includes mounted-card identification information for a corresponding expansion slot; and
   determining an unsupported expansion card among the plurality of expansion cards based on the first mounted-card information table and supported-card identification information of a selected operating system, wherein the unsupported expansion card is not supported by the selected operating system; and
   wherein powering off the unsupported expansion card comprises:
   deleting an entry for the unsupported expansion card from the first mounted-card information table to produce a second mounted-card information table for operation of the selected operating system; and
   powering off an expansion slot mounted with the unsupported expansion card to conceal the unsupported expansion card from the selected operating system.

3. The method of claim 1, wherein a basic input output system (BIOS) for said computer system performs said determining of said unsupported expansion card.

4. The method of claim 1, further comprising selecting one of said plurality of operating systems.

5. The method of claim 4, wherein a basic input output system (BIOS) for said computer system performs said selecting of one of said plurality of operating systems.

6. The method of claim 1, wherein previously storing supported-card identification information comprises storing supported-card identification information in a flash read-only memory.

7. A method for controlling concealment of a plurality of expansion cards mounted in a computer system selectively operable in a plurality of operating systems, comprising:
   previously storing supported-card identification information, wherein the supported-card identification information identifies types of expansion cards supported by respective ones of the operating systems;
   creating a first mounted-card information table upon system startup, wherein the first mounted-card information table contains entries for respective ones of the plurality of expansion cards mounted in the computer system, wherein each of the entries includes mounted-card identification information for a corresponding expansion slot;
   storing startup information including the first mounted-card information table and setting information of a selected operating system;
   determining whether the startup information is different from previous-startup information, wherein the previous-startup information includes previous setting information of a previously selected operating system and a previously stored first mounted-card information table;
   when the startup information is different from previous-startup information, determining an unsupported expansion card among the plurality of expansion cards based on the first mounted-card information table and supported-card identification information of the selected operating system, wherein the unsupported expansion card is not supported by the selected operating system;
   deleting an entry for the unsupported expansion card from the first mounted-card information table to produce a second mounted-card information table for operation of the selected operating system;

when the startup information is identical to the previous-startup information, using a previously stored second mounted-card information table as the second mounted-card information table;

powering off an expansion slot mounted with an unsupported expansion card depending on the second mounted-card information table to conceal the unsupported expansion card from the selected operating system;

storing the second mounted-card information table; and booting up the selected operating system based on the second mounted-card information table.

8. A computer system selectively operable in a plurality of operating systems, comprising:

a terminal device for designating a startup operating system from the plurality of operating systems;

a plurality of expansion slots for mounting a plurality of expansion cards;

a memory device storing supported-card identification information, wherein the supported-card identification information identifies at least two types of expansion cards, each type supported by a respective one of the plurality of operating systems;

a computation device for determining whether each of the plurality of expansion cards mounted is supported by the designated operating system, based on identification information supported by a designated operating system; and a power controller for powering off an expansion slot mounted with an expansion card that is not supported by the designated operating system before the designated operating system is booted.

9. The system of claim 8, wherein said computation device comprises a basic input output system (BIOS) for said computer system.

10. The system of claim 8, wherein said terminal device communicates with a basic input output system (BIOS) for said computer system to designate said startup operating system from said plurality of operating systems.

11. The system of claim 8, wherein said memory device comprises a flash read-only memory.

12. The computer system according to claim 8, wherein the computation device preforms:

creating a first mounted-card information table upon a system startup, wberein the first mounted-card information table contains entries for respective ones of the plurality of expansion cards mounted in the computer system, wherein each of the entries includes mounted-card identification information for a corresponding expansion slot;

determining an unsupported expansion card among the plurality of expansion cards based on the first mounted-card information table and supported-card identification information of the designated operating system, wherein the unsupported expansion card is not supported by the designated operating system; and deleting an entry for the unsupported expansion card from the first mounted-card information table to produce a second mounted-card information table for operation of the designated operating system, and wherein the power controller powers off an expansion slot mounted with the unsupported expansion card to conceal the unsupported expansion card from the designated operating system.

13. A computer system selectively operable in a plurality of operating systems, comprising:

a terminal device for designating a startup operating system from the plurality of operating systems;

a plurality of expansion slots for mounting a plurality of expansion cards;

a first memory device storing supported-card identification information, wherein the supported-card identification information identifies types of expansion cards supported by respective ones of the operating systems;

a second memory for storing a first mounted-card information table created upon system startup, wherein the first mounted-card information table contains entries for respective ones of the plurality of expansion cards, wherein each of the entries includes mounted-card identification information for a corresponding expansion slot;

a third memory for storing startup information including the first mounted-card information table and setting information of a designated operating system;

a computation device for determining whether the startup information is different from previous-startup information, wherein the previous-startup information includes previous setting information of a previously designated operating system and a previously stored first mounted-card information table, wherein, when the startup information is different from previous-startup information, the computation device determines an unsupported expansion card among the plurality of expansion cards based on the first mounted-card information table and supported-card identification information of the designated operating system, wherein the unsupported expansion card is not supported by the designated operating system, wherein the computation device deletes an entry for the unsupported expansion card from the first mounted-card information table to produce a second mounted-card information table for operation of the designated operating system;

wherein, when the startup information is identical to the previous-startup information, the computation device uses a previously stored second mounted-card information table as the second mounted-card information table, and wherein the computation device stores the second mounted-card information table, and boots up the selected operating system based on the second mounted-card information table; and a power controller for powering off an expansion slot mounted with an unsupported expansion card depending on the second mounted-card information table to conceal the unsupported expansion card from the selected operating system.

14. A method for controlling concealment of a plurality or expansion cards mounted in a computer system selectively operable in a plurality of operating systems, comprising:

previously storing supported-card identification information, wherein the supported-card identification information identifies at least two types of expansion cards, each type supported by a respective one of the plurality of operating systems;

detecting a physical mounting status of each of the plurality of expansion cards;

determining whether each of the plurality of expansion cards is supported by the selected operating system, based on identification information supported by a selected operating system;

updating the physical mounting status by deleting an unsupported expansion card from the physical mounting status to produce a logical mounting status of each of the plurality of expansion cards;

powering off an unsupported expansion card; and booting the selected operating system based on the logical mounting status of each of the plurality of expansion cards after said powering off of said unsupported expansion card.

15. The method of claim 14, wherein a basic input output system (BIOS) for said computer system performs said determining whether each of the physically mounted expansion cards is supported by the selected operating system.

16. The method of claim 14, further comprising selecting one of said plurality of operating using a basic input output system (BIOS) for said computer system.

17. The method of claim 14, wherein previously storing supported-card identification information comprises storing supported-card identification information in a flash read-only memory.

18. A basic input/output system code for a computer system selectively operable in a plurality of operating systems comprising:

a terminal device for designating a startup operating system from the plurality of operating systems;

a plurality of expansion slots for mounting a plurality of expansion cards;

a memory device storing supported-card identification information wherein the supported-card identification information identifies types of expansion cards supported by respective ones of the operating systems, the basic input/output system code comprising instructions for:

creating a first mounted-card information table upon system startup, wherein the first mounted-card information table contains entries for respective ones of the plurality of expansion cards, wherein each of the entries includes mounted-card identification information for a corresponding expansion slot;

determining an unsupported expansion card among the plurality of expansion cards based on the first mounted-card information table and supported-card identification information of a designated operating system, wherein the unsupported expansion card is not supported by the designated operating system;

deleting an entry for the unsupported expansion card from the first mounted-card information table to produce a second mounted-card information table for operation of the designated operating system; and setting a control register depending on the second mounted-card information table, wherein the control register is used to individually perform power-on/off control of the expansion slots to conceal an unsupported expansion card from the designated operating system.

19. A basic input/output system code for a computer system selectively operable in a plurality of operating systems comprising:

a terminal device for designating a startup operating system from the plurality of operating systems;

a plurality of expansion slots for mounting a plurality of expansion cards;

a memory device storing supported-card identification information, wherein the supported-card identification information identifies types of expansion cards supported by respective ones of the operating systems, the basic input/output system code comprising instructions for:

creating a first mounted-card information table upon system startup, wherein the first mounted-card information table contains entries for respective ones of the plurality of expansion cards mounted in the computer system, wherein each of the entries includes mounted-card identification information for a corresponding expansion slot;

storing startup information including the first mounted-card information table and setting information of a designated operating system;

determining whether the startup information is different from previous-startup information, wherein the previous-startup information includes previous setting information of a previously designated operating system and a previously stored first mounted-card information table;

when the startup information is different from previous-startup information, determining an unsupported expansion card among the plurality of expansion cards based on the first mounted-card information table and supported-card identification information of the designated operating system, wherein the unsupported expansion card is not supported by the designated operating system;

deleting an entry for the unsupported expansion card from the first mounted-card information table to produce a second mounted-card information table for operation of the designated operating system;

when the startup information is identical to the previous-startup information, using a previously stored second mounted-card information table as the second mounted-card information table;

setting a control register depending on the second mounted-card information table, wherein the control register is used to individually perform power-on/off control of the expansion slots to conceal an unsupported expansion card from the designated operating system; and storing the second mounted-card information table.

* * * * *